United States Patent [19]
Funaki

[11] Patent Number: 5,432,894
[45] Date of Patent: Jul. 11, 1995

[54] GRAPHIC DATA PROCESSING SYSTEM WITH IMPROVED RETRIEVAL AND DISPLAY OF GRAPHICAL FORMS

[75] Inventor: Shigeo Funaki, Kawasaki, Japan

[73] Assignee: Fujitsu Limited, Kawasaki, Japan

[21] Appl. No.: 933,494

[22] Filed: Aug. 21, 1992

[30] Foreign Application Priority Data

Aug. 23, 1991 [JP] Japan .................................. 3-212400

[51] Int. Cl.⁶ ............................................. G06F 15/72
[52] U.S. Cl. .................................. 395/119; 395/127; 395/134
[58] Field of Search ............... 395/119, 127, 134, 120, 395/157, 126, 123

[56] References Cited

U.S. PATENT DOCUMENTS

| | | | |
|---|---|---|---|
| 3,816,726 | 6/1974 | Sutherland | 395/127 X |
| 4,208,810 | 6/1980 | Rohner et al. | 395/127 X |
| 4,888,712 | 12/1989 | Barkans et al. | 395/134 |
| 4,994,989 | 2/1991 | Usami et al. | 395/120 |
| 5,003,497 | 3/1991 | Priem | 395/119 |
| 5,012,433 | 4/1991 | Callahan et al. | 395/134 |
| 5,051,737 | 9/1991 | Akeley et al. | 395/134 |
| 5,123,084 | 6/1992 | Prevost et al. | 395/120 |

FOREIGN PATENT DOCUMENTS

| | | |
|---|---|---|
| 0311081 | 4/1989 | European Pat. Off. . |
| 0403116 | 12/1990 | European Pat. Off. . |
| 2-35573 | 2/1990 | Japan . |

OTHER PUBLICATIONS

*IBM Technical Disclosure Bulletin*, vol. 33, No. 10B, "Graphics Object Selection System," New York, N.Y., XP110302, Mar. 1991, pp. 473–474.

*Primary Examiner*—Raymond J. Bayerl
*Attorney, Agent, or Firm*—Staas & Halsey

[57] ABSTRACT

A method and apparatus for retrieving graphical data from a graphic data processing system that processes graphical forms, the graphic data processing system being responsive to a processing request to retrieve a graphical form from a designated region or a processing request to display a graphical form from a designated region. A three-dimensional figure is established which contains at least one graphical form and a spatial position of the three-dimensional figure is obtained. The spatial position is stored as region information. Graphic data for each graphical form contained in the three-dimensional figure is stored as graphical information. A graphic element is formed for the three-dimensional figure, the graphic element being a combination of the region information for the three-dimensional figure and the graphical information of each graphical form contained in the three-dimensional figure. When a processing request is requested for a designated region, it is determined whether the three-dimensional figure lies at least partially within the designated region, the determination being performed by analyzing the region information of the graphic element. The graphic data contained in the three-dimensional figure is excluded from further processing by the processing request when the three-dimensional figure is determined to lie outside the designated region. The graphic data contained in the three-dimensional figure is selected for further processing by the processing request when the three-dimensional figure is determined to lie within the designated region.

12 Claims, 7 Drawing Sheets

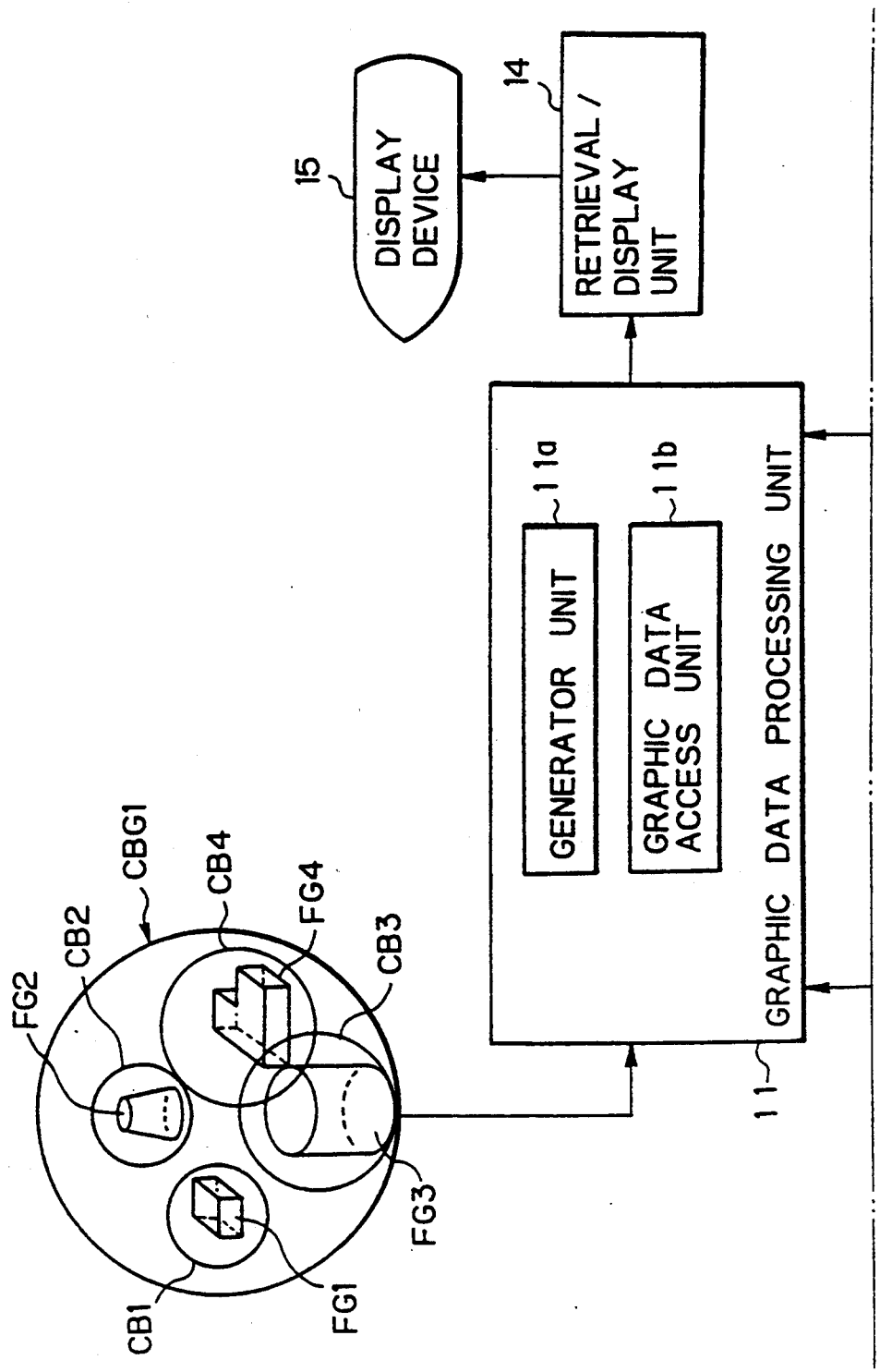

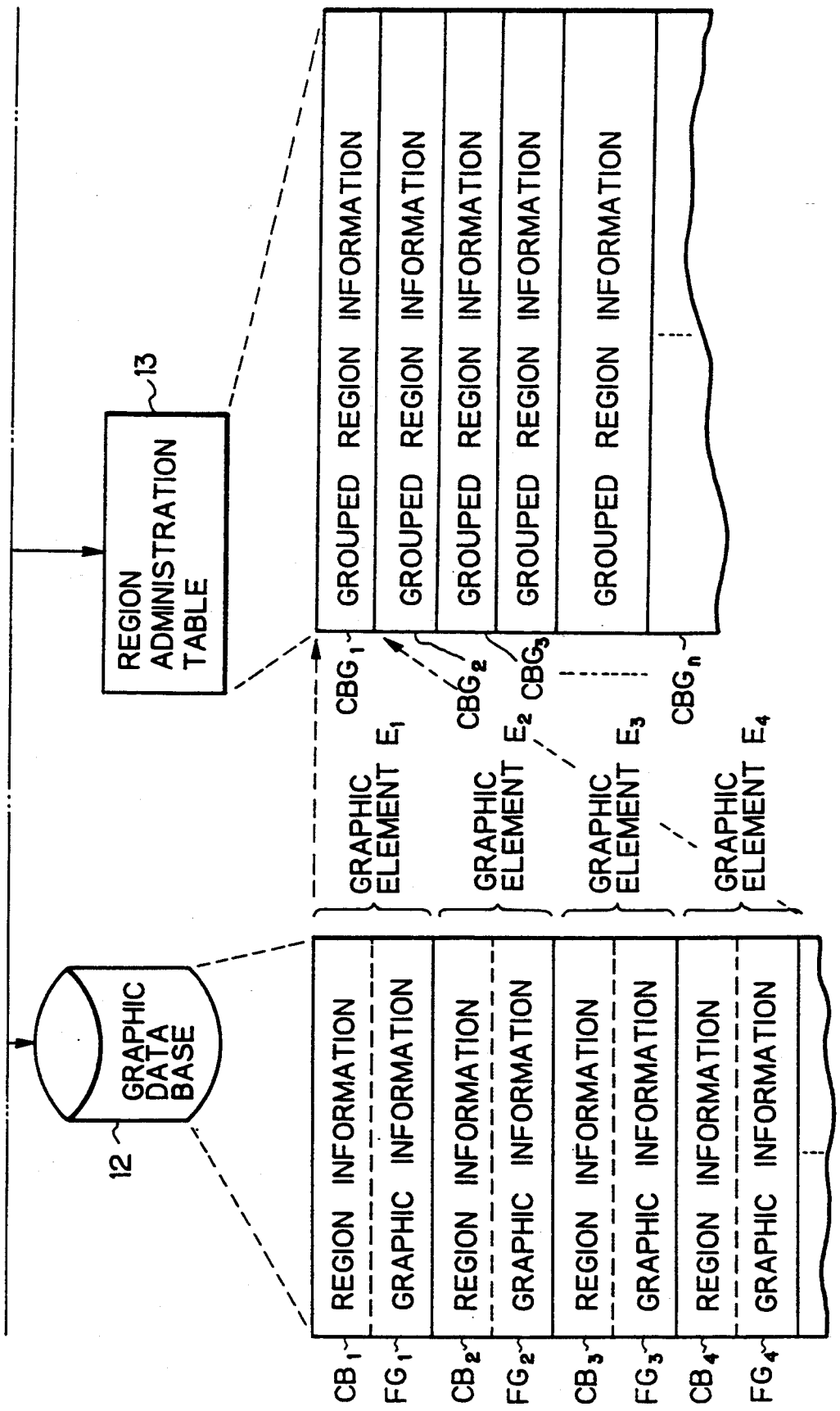

GRAPHIC DATA PROCESSING SYSTEM WITH IMPROVED RETRIEVAL AND DISPLAY OF GRAPHICAL FORMS

BACKGROUND OF THE INVENTION

1. Field of the Invention

This invention relates to a graphic data processing system and, particularly to a graphic data processing system for retrieving or displaying data concerning a graphical form which is entirely or partially contained in a designated three-dimensional space, at a high speed.

2. Description of the Related Art

In a CAD system, there is frequently executed a process in which only the data concerning a graphical form contained in a designated three-dimensional space is displayed or retrieved out of multiple graphical forms, each graphical form constituting a three-dimensional figure. For instance, a process is frequently executed in which a graphical form displayed on a screen is entirely or partially enlarged, rotated, or moved to other display sections on the screen. In this process, it is required to discriminate whether a graphic element of each individual graphical form constituting the three-dimensional figure is contained in a designated region. In an existing CAD system, it is discriminated whether the graphical form is entirely or partially contained in the designated region with respect to all the stored graphic data concerning the graphical forms. Based on the discrimination result, the graphical form which is not contained in the designated region is neither displayed nor retrieved, whereas the one contained therein is displayed or retrieved.

However, a large number of processing steps are required in the conventional system in which it is checked in detail whether the graphical form is contained in the designated region with respect to all the graphical forms. Accordingly, the conventional system requires substantial time to obtain a complete display or retrieval result, thereby presenting the problem of a reduced working efficiency.

SUMMARY OF THE INVENTION

In view of the above, it is an object of the present invention to provide a graphic data processing system capable of retrieving or displaying at a high speed a graphical form which is entirely or partially contained in a designated three-dimensional space, and thus improve working efficiency.

It is another object of the present invention to provide a graphic data processing system which discriminates at a high speed whether a graphical form is contained in a designated three-dimensional space by approximating a region occupied by the graphical form to a specific three-dimensional form such as a sphere or a rectangular parallelepiped.

In order to accomplish the above objects, a graphic data processing system according to the invention comprises the following technical construction. More specifically, the invention is directed to a graphic data processing system in which at least one of a retrieval process and a display process is applied to a graphical form contained entirely or partially in a designated three-dimensional space, the system comprising the steps of setting either a specific three-dimensional figure containing an individual graphical form or a specific three-dimensional figure containing a group including a plurality of graphical forms, obtaining a spatial position of the set specific three-dimensional figure, and storing the obtained spatial position as region information; storing graphical information which is graphic data concerning the graphical form for either the individual graphical form or the group including the plurality of graphical forms contained in the set specific three-dimensional figure; combining the region information and the graphic information so as to form a graphic element; discriminating, when either a retrieval region or a display region in the three-dimensional space is designated, whether the set specific three-dimensional figure lies at least partially within the designated region with reference to the region information; excluding the graphic data contained in the set specific three-dimensional figure from those to be processed in either the retrieval process or the display process selected in the graphic data processing system if the set three-dimensional figure is discriminated to lie outside the designated region in the discriminating step; and selecting the graphic data contained in the set specific three-dimensional figure as the one to be processed in either the retrieval process or the display process selected in the graphic data processing system if the set three-dimensional figure is discriminated to lie within the designated region in the discriminating step.

BRIEF EXPLANATION OF THE DRAWINGS

FIGS. 1A and 1B are diagrams for explaining the principle of the invention;

FIG. 5 is a flow chart showing a registration operation of the graphic information, region information, and the like.

DETAILED DESCRIPTION OF THE PREFERRED EMBODIMENTS

Figure 2:
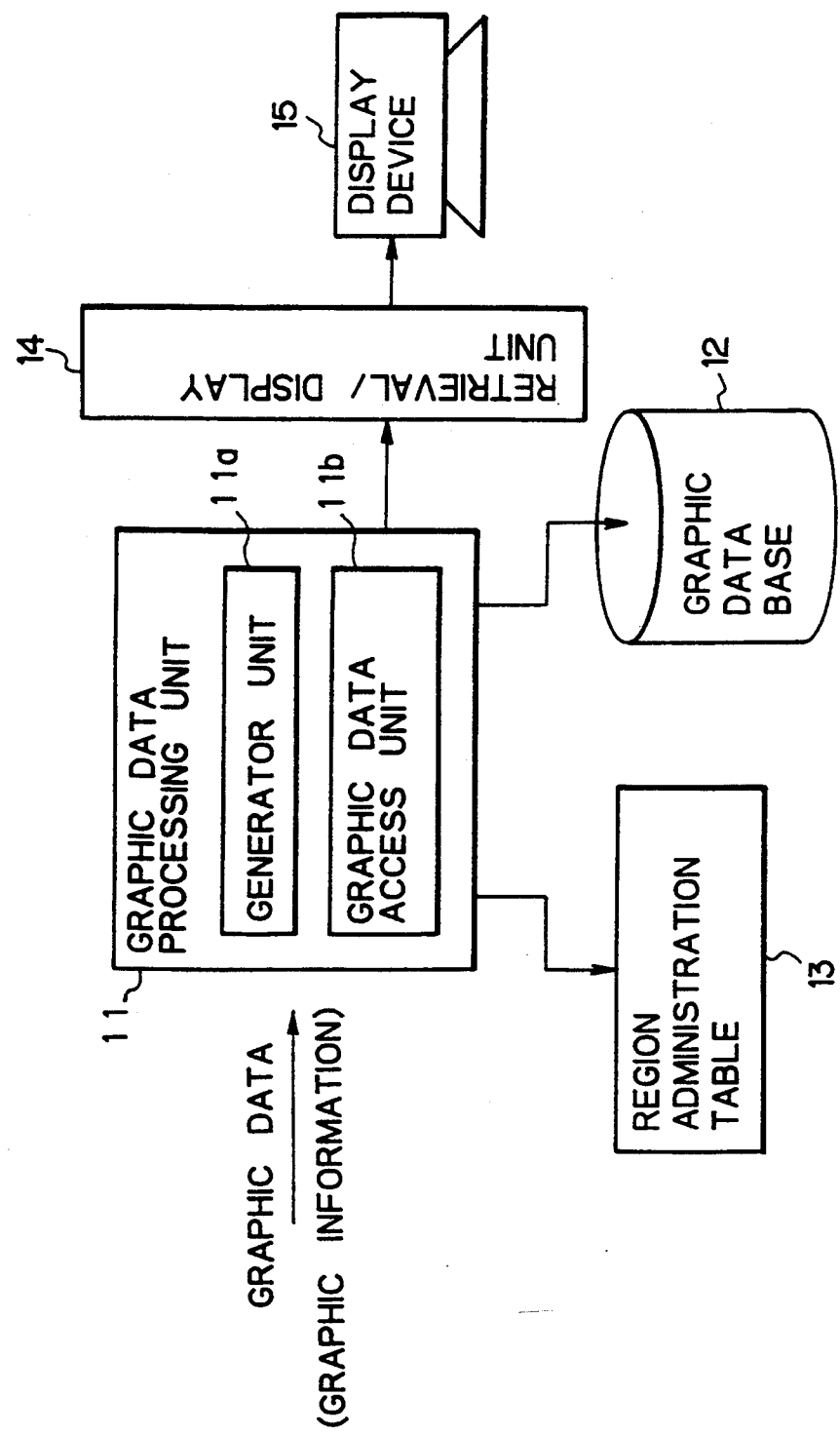
FIG. 2 is a construction diagram showing an exemplary embodiment of the invention.

A specific example of a graphic data processing system according to the invention will be described in detail with reference to the accompanying drawings.

The graphic data processing system according to the invention comprises the technical construction as described above. A specific construction for executing the system is shown in FIGS. 1A and 1B.

In FIGS. 1A and 1B, indicated at 11 is a graphic data processing unit, at 11a a graphic data base/region administration table generator unit, at 11b a graphic data access unit, at 12 a graphic data base, at 13 a region administration table, at 14 a graphic data retrieval/display unit, and at 15 a display device. The graphic data base 12 combines (1) graphic data (graphic information) and (2) three-dimensional spatial position information (region information) including a center and a radius of a sphere when a region occupied by the graphical form is approximated to the sphere, which is a specific example of a specific three-dimensional form, and stores the combined information as a graphic element for each graphical form. The region administration table 13 groups several graphic elements and stores a center and a radius of a grouping sphere containing all the graphic elements belonging to the same group as three-dimensional spatial position information (grouped region information).

Upon input of graphic information on the individual graphical forms FG1, FG2, FG3, FG4, . . . each constituting a three-dimensional figure, the generator unit 11a obtains the three-dimensional spatial position information (center and radius) of spheres CB1, CB2, CB3, CB4, . . . as region information. The obtained region information is transferred to the graphic data base 12 together with the graphic information as graphic elements E1, E2, E3, E4, . . . , and is stored therein. The generator unit 11a also groups several graphic elements E1 to E4, obtains as grouped region information the three-dimensional spatial position information (center and radius) of a grouping sphere CBG1 containing all the graphical forms FG1 to FG4 belonging to the same group, and registers the obtained grouped region information in the region administration table 13. Likewise, grouped region information CBG2 to CBG4 are obtained for the other groups. In this state, upon designation of a retrieval or display region in a three-dimensional space, the graphic data access unit 11b discriminates whether the grouping sphere lies within the designated region with reference to the grouped region information CBG1 to CBG4 stored in the region administration table 13. If the grouping sphere lies outside the designated region, the access unit 11b excludes all the graphic elements E1 to E4 constituting that group from those to be retrieved or displayed. On the contrary, if the grouping sphere lies within the designated region, the access unit 11b transfers the graphic information FG1 to FG4 of the respective graphic elements E1, E2, E3, and E4 constituting that group and region information CB1 to CB4 to the graphic data retrieval/display unit 14. The retrieval/display unit 14 in turn discriminates whether the sphere corresponding to each of the graphic elements E1 to E4 lies within the designated region with reference to the region information thereof. If the sphere lies outside the designated region, the graphic element corresponding thereto is excluded from those to be retrieved or displayed. On the contrary, if the sphere lies within the designated region partially or entirely, the graphic element corresponding thereto is displayed in the display device 15 as the one to be retrieved or displayed.

As stated above, the regions occupied by the respective graphic elements E1 to E4 are approximated to the specific three-dimensional forms (sphere or rectangular parallelepiped). Further, several graphic elements E1 to E4 are grouped and a region occupied by all the graphic elements belonging to the same group is approximated to another specific three-dimensional form (sphere or rectangular parallelepiped) CBG1. With the use of the specific three-dimensional form containing the group such as a sphere and a rectangular parallelepiped, it is roughly discriminated whether the group lies within the designated region, and only the graphic elements belonging to the group lying within the designated region are discriminated in more detail. Accordingly, the graphic elements entirely or partially contained in the designated three-dimensional space can be retrieved or displayed at high speed, thereby improving working efficiency.

If all the individual graphic data concerning each graphical form such as X-, Y-, Z-coordinates of a start point and an end point, the length of a line segment, the direction, and the angle are used as parameters in a retrieval processing or display processing, a huge amount of time is required for processing. In view of this, the system according to the invention is constructed as described above. The system according to the invention is analogous to the conventional systems in that graphic information concerning each individual graphical form constituted by a plurality of graphic data is stored in a predetermined memory means. However, the system according to the invention differs from the conventional systems in the following points. The graphic information concerning the individual graphical form is represented as a specific three-dimensional form. If, for example, discrimination is made as to whether a given graphical form exists in executing the retrieval or display operation, it is discriminated whether the specific three-dimensional form exists in a specified area on a screen without accessing all the graphic information concerning all the stored graphical forms for comparison and determination. Unless the three-dimensional form exists in the specified area, the graphic information concerning the specific graphical form contained in that three-dimensional form is not used for the processing at all. Only if the three-dimensional form exists in the specified area, the graphic information concerning the specific graphical form contained in that three-dimensional form is processed to be displayed.

A specific three-dimensional form used in the invention is not particularly limited, but any form is usable provided that it constitutes a three-dimensional space having one form selected from a sphere, a rectangular parallelepiped, a cone, a cylinder, a prism, a pyramid, truncated cone, and the like.

According to the invention, it is preferable that the specific three-dimensional form is a sphere in view of the process.

According to the invention, in setting the specific three-dimensional form, it is preferable that the size of the specific three-dimensional form is set such that the individual graphical form already stored in the memory means is inscribed in the specific three-dimensional form.

Thus, in the case where a sphere is used as a specific three-dimensional form, a radius thereof is required to be set at such a dimension that a specific stored graphical form is completely inscribed in the sphere.

As will be seen from the above situation, the size of the specific three-dimensional form used in the invention is variable depending upon the size of the individual graphical form to be used.

Further, according to the invention, when the specific three-dimensional form is set for each of the graphical forms, there is affixed thereto information indicative of which position the three-dimensional form exists in the three-dimensional space.

For instance, if the specific three-dimensional form is a sphere, coordinate information of a center of the sphere and a radius thereof are necessary. In order cases, for example, coordinate information of a vertex, the orientation of a line segment, the length of the line segment, and the like are necessary.

This information serves as region information CB1 to CBn concerning graphical forms.

More specifically, according to the invention, the region information obtained by the use of the specific three-dimensional form indicates the graphical form exists in the determined space region.

According to the invention, as described above, the graphic information FG1 to FGn and region information CB1 to CBn concerning the respective stored graphical form are combined to integrally form the graphic elements E1 to En. With the use of the graphical elements E1 to En, a retrieval or display process is executed.

Thus, for example, in the case where a specified graphical form is retrieved out of a plurality of those displayed on a screen, and is displayed in enlarged form, a retrieval region having a specified range is first set. One of the specific three-dimensional forms existing in the retrieval region is retrieved with the use of the region information concerning that specific three-dimensional form. The display data is generated with the use of the graphic information concerning the retrieved specific three-dimensional form, and displayed in the specified region on the screen. With this system, since no graphic information which is not required for the processing is processed, the processing speed is remarkably increased.

If a procedure of the graphic data processing system according to the invention is summarily described, a visual frame corresponding to the retrieval range is set on the display screen and memory is cleared.

Normally, the visual frame of the retrieval range is circular or rectangular.

Next, a cylinder or a prism having the set retrieval range as a cross-section is virtually formed in the depth direction of the screen.

Then, it is discriminated whether the space occupied by the prism or the cylinder corresponds at least partially with the space based on the region information CB1 to CBn included in the graphic elements set for the respective graphical form.

In other words, it is discriminated whether each specific three-dimensional form containing the graphical form therein lies entirely or partially within the spatial region defined by the retrieval range by making comparisons. If the above discrimination is in the affirmative, the graphic information included in the graphic element of that graphical form is selected as the one to be processed, and the display data is generated using the same. The graphical form is displayed in a suitable form, for example, in an enlarged, reduced or rotated form using the generated display data.

In the invention, it can be readily discriminated whether each specific three-dimensional form containing the graphical form therein lies entirely or partially within the spatial region defined by the retrieval range by making comparisons if, for example, a cross-section of the spatial region defined by the retrieval range is a circle and the specific three-dimensional form containing the graphical form therein is a sphere. Specifically, the discrimination can be made by a known method using the distance between the centers of the cross-section and the specific three-dimensional form and the radii thereof.

In the foregoing embodiment, the aforementioned process is carried out for each graphical form. It may be appropriate that the graphic elements of a plurality of graphical form are formed into one group, another specific three-dimensional form is formed for that group, and the aforementioned region information is affixed to that specific three-dimensional form. When the retrieval/display processing for the graphical form is executed, it is possible to first make the discrimination by group, and then to execute the aforementioned processing for each graphical form. Adoption of this method enables more efficient execution of the processing.

A procedure of executing the above graphic data processing system according to the invention will be described in detail next with reference to FIGS. 2 to 6.

FIG. 2 is a construction diagram of the embodiment according to the invention. It will be appreciated that like reference numerals designate like parts or elements in FIGS. 1A, 1B and 2. In FIG. 2, indicated at 11 is a graphic data processing unit, at 11a a graphic data base/region administration table generator unit, at 11b a graphic data access unit, at 12 a graphic data base, at 13 a region administration table, at 14 a graphic data retrieval/display unit, and at 15 a display device. The graphic data base 12 stores as graphic element E1 to En (1) graphic data (graphic information) and (2) three-dimensional spatial position information (region information) including a center and a radius of a sphere when regions occupied by the graphical forms are approximated to the spheres. The region administration table 13 groups several graphic elements E1 to En and stores a center and a radius of a grouping sphere containing all the graphic elements belonging to the same group as a grouped region information CBG1.

Figure 3:
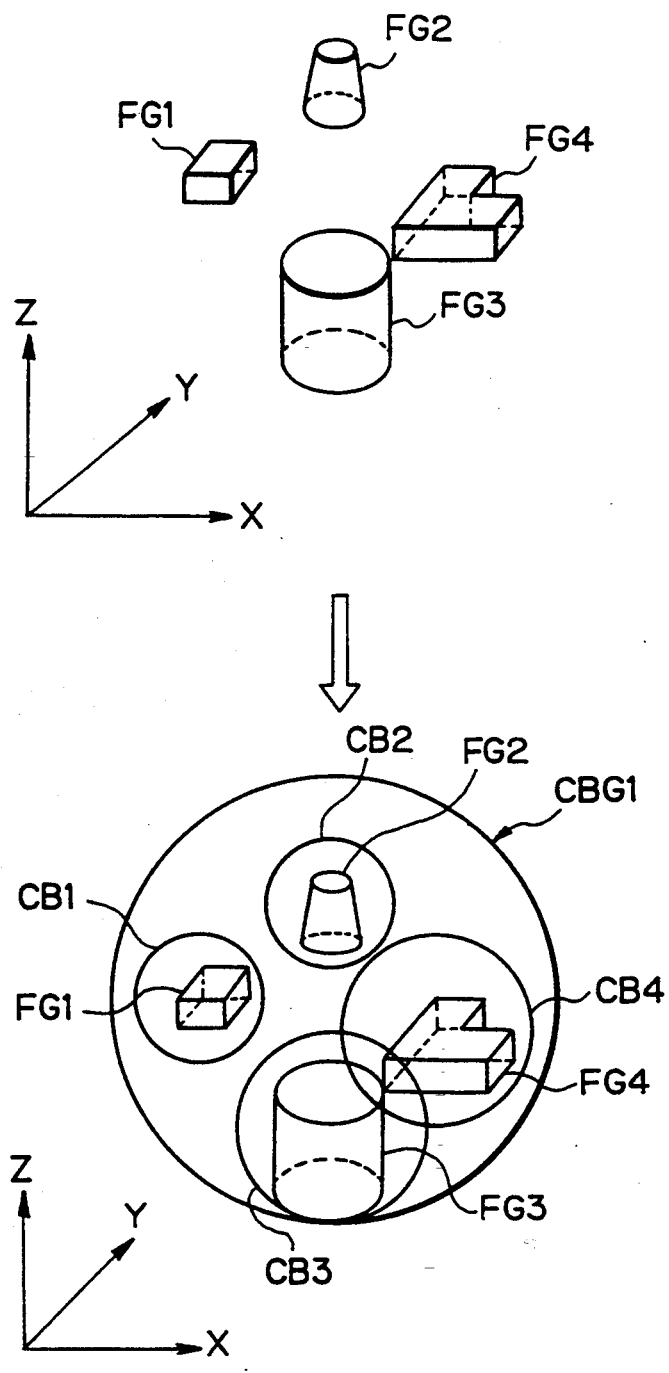
FIG. 3 is a diagram showing graphic information, region information, and grouped region information.
Figure 4:
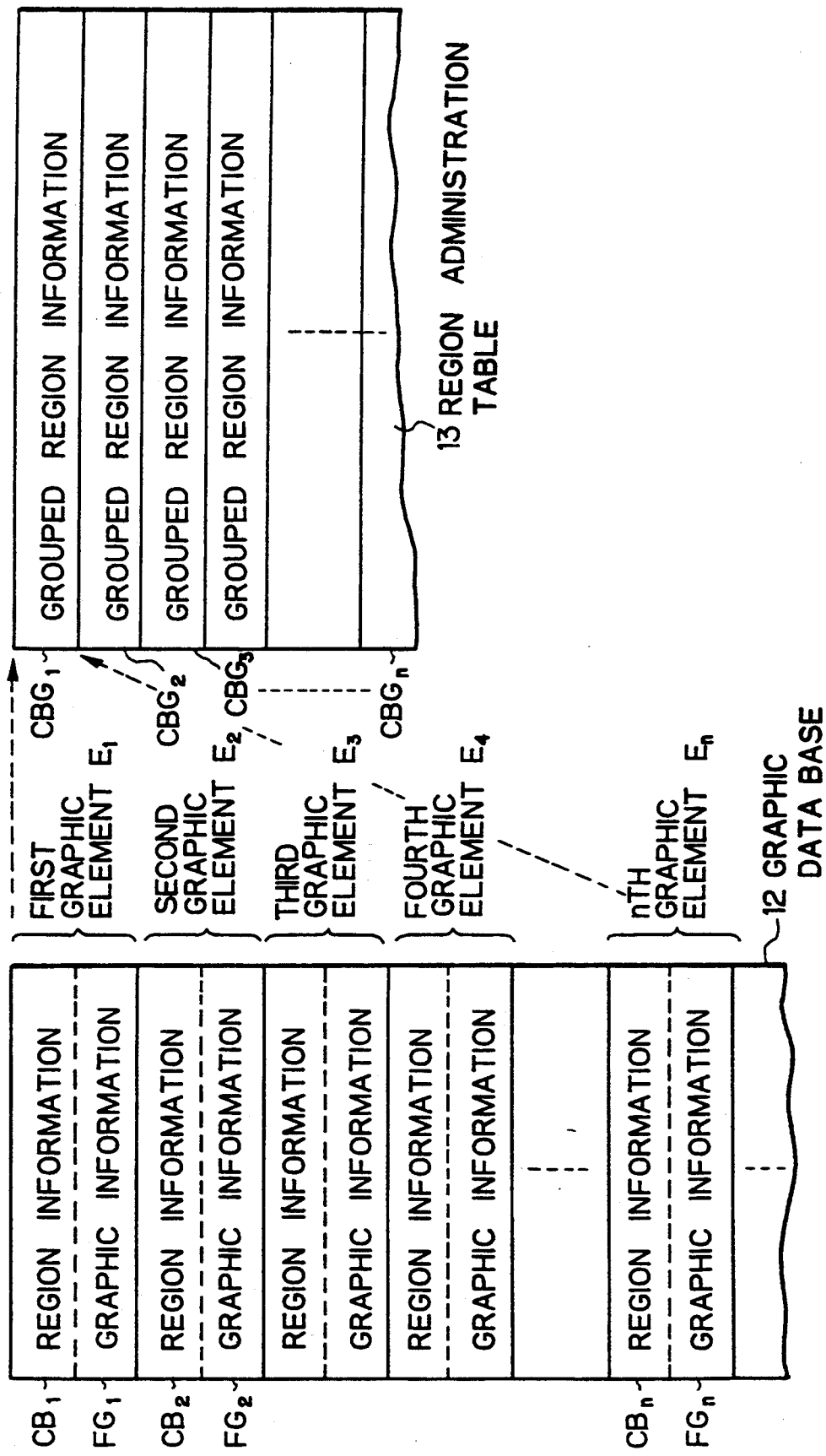
FIG. 4 is a data construction diagram of a graphic data base and a region administration table.

FIG. 3 is a diagram showing the graphic information, the region information, and the grouped region information. Indicated at FG1, FG2, FG3, FG4, . . . are individual graphical forms each constituting a three-dimensional figure. Indicated at CB1, CB2, CB3, CB4, . . . are spheres containing the respective graphical forms FG1, FG2, FG3, FG4, . . . For example, these spheres may be circumscribing spheres externally touching the regions occupied by the respective graphical forms. Indicated at CBG1 is a grouping sphere (e.g. circumscribing sphere) containing all the graphical forms belonging to the same group when several graphic elements are grouped.

Upon input of graphic information concerning the individual graphical forms FG1, FG2, FG3, FG4, . . . each constituting a three-dimensional figure, the generator unit 11a obtains the three-dimensional spatial position information (center and radius) of the spheres CB1, CB2, CB3, CB4, . . . containing the respective graphical forms as region information. The obtained region information is transferred to the graphic data base 12 together with the graphic information as graphic elements and is stored therein. The generator unit 11a also groups several graphic elements, and obtains as a grouped region information the three-dimensional spatial position information (center and radius) of the grouping sphere CBG1 containing all the graphical forms FG1 to FG4 belonging to the same group, and registers the obtained grouped region information in the region administration table 13. It will be understood that the grouping is carried out each time the number of the graphic elements reaches a predetermined number, or each time an amount of graphic information reaches a predetermined amount.

Upon designation of a retrieval or display region in a three-dimensional space, the graphic data access unit 11b discriminates whether the grouping spheres (CBG1, . . . ) lie within the designated region with reference to the grouped region information stored in the region administration table 13. If the grouping sphere lies outside the designated region, the access unit 11b excludes all the graphic elements constituting that group from those to be retrieved or displayed. On the contrary, if the grouping sphere lies within the designated region, the access unit 11b transfers the graphic information and region information included in the respective graphic elements constituting that group to the graphic data retrieval/display unit 14.

The retrieval/display unit 14 in turn discriminates whether the sphere containing the graphical form lies within the designated region for each graphic (FG1 to FG4) with reference to the region information thereof. If the sphere lies outside the designated region, the graphic information corresponding thereto is excluded from those to be retrieved or displayed. On the contrary, if the sphere lies within the designated region partially or entirely, the graphic information corresponding thereto is selected as the one to be retrieved or displayed, and is displayed on the display device 15.

Figure 5:
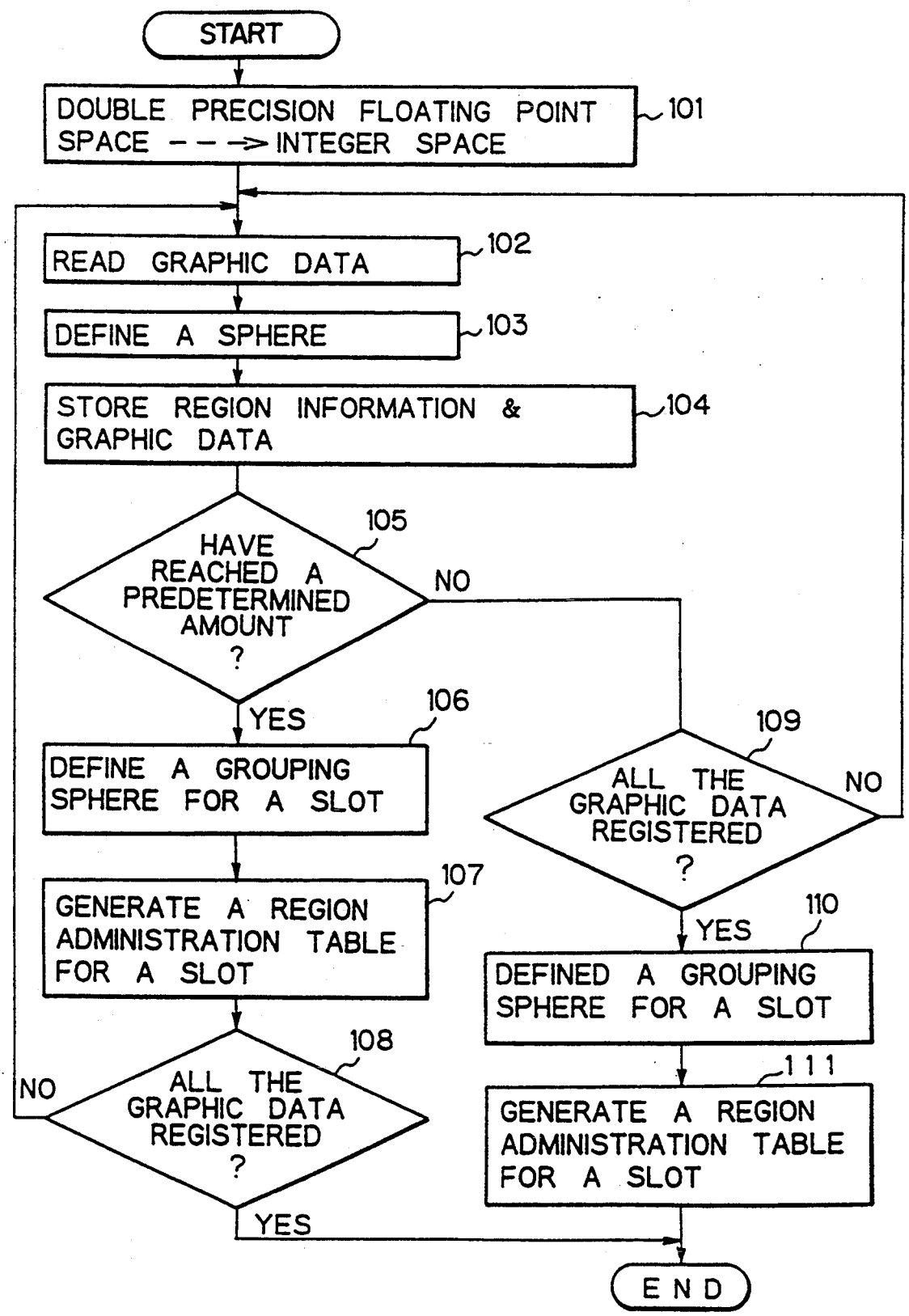
Figure 6:
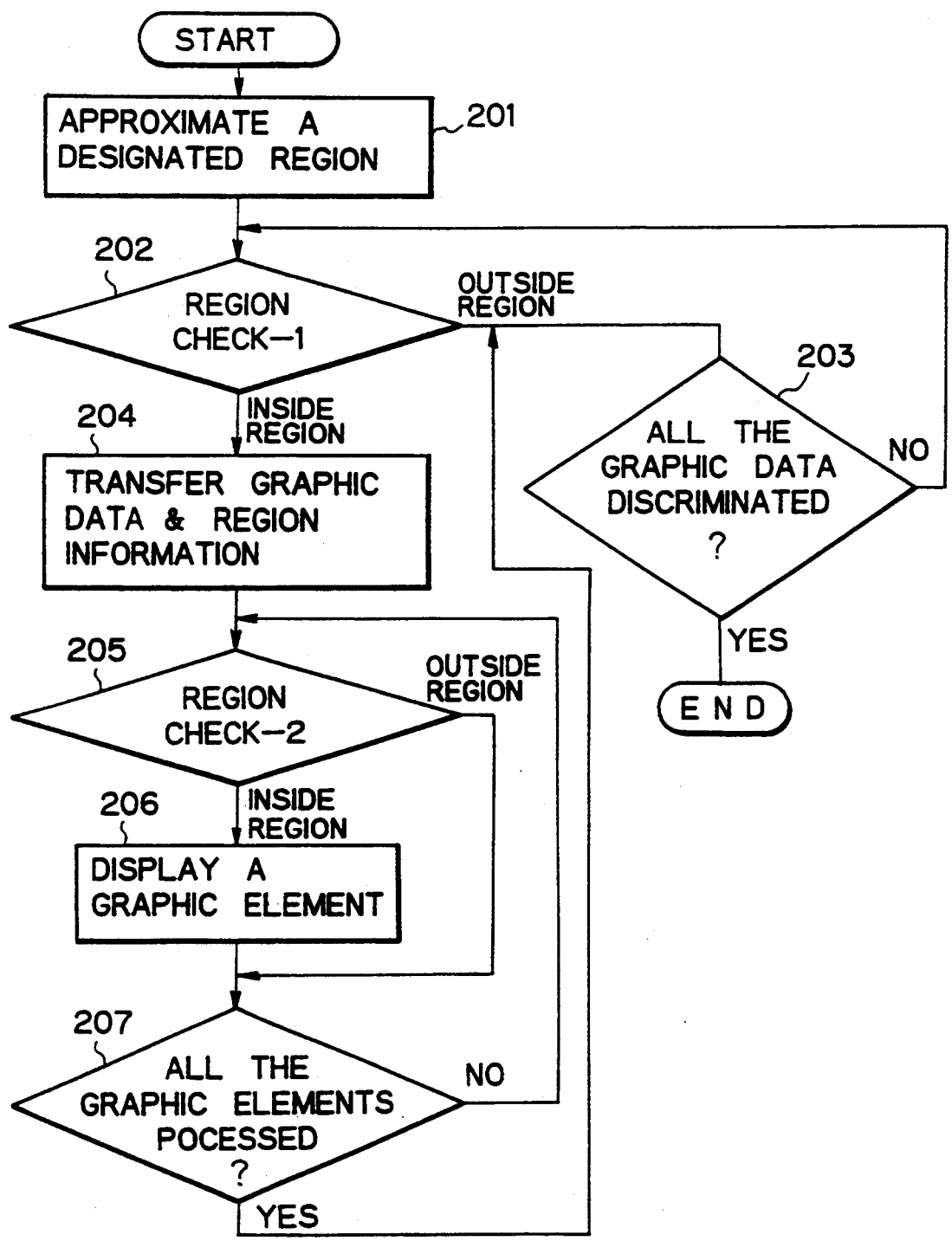
FIG. 6 is a flow chart showing a display/retrieval processing.

FIG. 5 is a flow chart showing registration processing of the graphic information, the region information, and the grouped region information, and FIG. 6 is a flow chart showing a display/retrieval process. Hereafter, the respective operations will be described.

(a) Registration Process

The generator unit 11a sets a region to be occupied by the graphic data (a double precision floating point space of 8 bytes) to an integer space of $2^{15} \times 2^{15} \times 2^{15}$ ($=32767 \times 32767 \times 32767$) prior to registration of the graphic data (Step 101). With this setting, the graphic data are all processed after being approximated to integers hereinafter.

Subsequently, the generator unit 11a reads the graphic data of each individual graphical form constituting a three-dimensional figure which is input by means of an not-illustrated host device or graphic data input device (step 102), and defines a sphere circumscribing the three-dimensional region occupied by the graphic data (Step 103). Thereafter, a center and a radius of a spherical space are obtained as region information, which is in turn registered in the graphic data base 12 together with the graphic data (graphic information) as a graphic element (Step 104).

Upon completion of the registration to the graphic data base 12, it is discriminated whether an amount of the registered graphic data has reached a predetermined amount (Step 105). If the discrimination is in the affirmative, there is defined a grouping sphere circumscribing the three-dimensional region occupied by a collection of the graphic data whose amount has reached the predetermined amount (hereinafter referred to as a slot) (Step 106). Then, a center and a radius of the three-dimensional space defined by the grouping sphere are obtained as grouped region information and is registered in the region administration table 13 (Step 107).

Thereafter, it is checked whether the registration has been completed for the graphic data of all the graphical forms (Step 108). If there still remains any graphic data to be registered, this routine returns to Step 102 and repeats the operations in the subsequent steps. The registration operation is completed if all the graphic data have been registered.

On the other hand, if the amount of the registered graphic data has not reached the predetermined amount in Step 105, it is checked whether the registration has been completed for the graphic data of all the graphical forms (Step 109). If there still remains any graphic data to be registered, this routine returns to Step 102 and repeats the operations in the subsequent steps. On the other hand, if all the graphic data have been registered, there is defined the grouping sphere circumscribing the three-dimensional region occupied by a collection (slot) of the graphic data registered thus far (Step 110). Further, a center and a radius of the three-dimensional space defined by the grouping sphere are obtained as grouped region information and is registered in the region administration table 13 (Step 117), thereby completing the registration processing.

(b) Display/Retrieval Processing

When the retrieval or display region in the three-dimensional space is designated in a state where the graphic data, the region information, and the grouped region information are registered in the graphic data base 12, the graphic data access unit 11b approximates the designated region to a rectangular parallelepiped in the integer space (Step 201).

Subsequently, the access unit 11b discriminates whether the grouping sphere lies within the designated region with reference to the grouped region information stored in the region administration table 13 (region check-1, Step 202). If the grouping sphere lies outside the designated region, the access unit 11b excludes all the graphic elements constituting that group from those to be retrieved or displayed, and checks whether the discrimination has been made for all the groups (Step 203). If there still remains any group to be discriminated, this routine returns to Step 202 and repeats the operations in the subsequent steps. If the discrimination has been made for all the groups, the display/retrieval processing is completed.

On the other hand, if the grouping sphere lies within the designated region in Step 202, the access unit 11b reads the graphic data and the region information of all the graphic elements constituting that group from the graphic data base 12, and transfers the same to the graphic data retrieval/display unit 14 (Step 204).

The retrieval/display unit 14 discriminates whether the sphere containing the graphical form lies within the designated region for all the input graphic elements with reference to the region information (region check-2, Step 205). If the sphere lies outside the designated region, the retrieval/display unit 14 excludes the graphic element from those to be retrieved or displayed. On the contrary, if the sphere lies partially or entirely within the designated region, the retrieval/display unit 14 selects that graphic element as the one to be retrieved or displayed, applies a detailed graphic display/retrieval processing, and consequently causes the display device 15 to display the processed graphical element or the retrieval result (Step 206).

Subsequently, it is checked whether the retrieval/display processing has been carried out for all the graphical forms constituting the slot (Step 207). If there still remains any graphical form to be processed, this routine returns to Step 205 and repeats the operations in the subsequent steps. If all the graphical forms have been processed, this routine returns to Step 203 and repeats the operations in the subsequent steps.

The foregoing embodiment is described with respect to a case where the region occupied by the graphical form is approximated to a sphere. However, such a region may be approximated to a rectangular parallelepiped in place of a sphere. In this case, the processing system may be constructed such that a spatial position of a specific point (e.g., specified vertex) of the rectangular parallelepiped and dimensions in respective axes are stored as three-dimensional spatial position information to be used in executing the graphical data processing.

Further, in the foregoing embodiment, the invention is described with respect to a case where a discrimination is made as to whether individual graphical forms each constituting a three-dimensional figure lie within a designated region. However, the individual graphical form may not necessarily constitute the three-dimensional figure.

While the invention has been particularly shown and described with reference to a preferred embodiment thereof, it will be understood that various changes and modifications that fall within the scope of the claims are therefore intended to be embraced by the claims.

As described above, according to the invention, a region occupied by a graphical form is approximated to a specific three-dimensional figure (a sphere, rectangular parallelepiped, or the like), and several of the graphical forms are grouped and a region occupied by all the graphical forms belonging to the same group is approximated to a specific grouping three-dimensional figure (a sphere, rectangular parallelepiped, or the like). It is roughly discriminated whether the graphical forms lie within a designated region using the grouping sphere or rectangular parallelepiped. Only the graphical forms belonging to the group lying in the designated region are discriminated in more detail. Accordingly, the graphical forms lying partially or entirely in the designated three-dimensional space can be retrieved or displayed at high speed, thereby improving working efficiency.

I claim:

1. A method of retrieving graphical data from a graphic data processing system that processes graphical forms, the graphic data processing system being responsive to a processing request to retrieve a graphical form from a designated region or a processing request to display a graphical form from a designated region, the method comprising:
   establishing a three-dimensional figure which contains at least one graphical form;
   obtaining a spatial position of the three-dimensional figure;
   storing the obtained spatial position, the stored spatial position being region information;
   storing graphic data for each graphical form contained in the three-dimensional figure, the stored graphic data being graphical information;
   forming a graphic element for the three-dimensional figure, the graphic element being a combination of the region information for the three-dimensional figure and the graphical information of each graphical form contained in the three-dimensional figure;
   determining, when a processing request is requested for a designated region, whether the three-dimensional figure lies at least partially within the designated region, the determining step being performed by analyzing the region information of the graphic element;
   excluding the graphic data contained in the three-dimensional figure from further processing by the processing request when the three-dimensional figure is determined to lie outside the designated region in the determining step;
   selecting the graphic data contained in the three-dimensional figure for further processing by the processing request when the three-dimensional figure is determined to lie within the designated region in the determining step.

2. A method as claimed in claim 1, wherein the three-dimensional figure represents a three-dimensional space having a form selected from the group comprising a sphere, a prism, a pyramid and a truncated cone.

3. A method as claimed in claim 2 wherein a spatial region defined by the three-dimensional figure has dimensions which are sufficient to contain a graphical form having a three-dimensional figure to be inscribed therein.

4. A method as claimed in claim 2 wherein the three-dimensional figure is a sphere.

5. A method as claimed in claim 1, the dimensions of each graphical form corresponding to a set of graphical axes, wherein:
   the step of establishing a three-dimensional figure establishes the three-dimensional figure to be a rectangular parallelepiped; and
   the step of obtaining a spatial position obtains a position, corresponding to the set of graphical axes, of a specific point of the rectangular parallelepiped and dimensions of each graphical form.

6. A method of retrieving graphical data from a graphic data processing system that processes graphical forms, the graphic data processing system being responsive to a processing request to retrieve a graphical form from a designated region or a processing request to display a graphical form from a designated region, the method comprising:
   establishing at least one individual three-dimensional figure, each individual three-dimensional figure containing at least one graphical form;
   obtaining a spatial position of each individual three-dimensional figure;
   storing the obtained spatial position of each individual three-dimensional figure, the stored spatial position of each individual three-dimensional figure being region information corresponding to the respective individual three-dimensional figure;
   storing, for each respective individual three-dimensional figure, graphic data for each graphical form contained in the respective individual three-dimensional figure, the stored graphic data for each graphical form being graphical information corresponding to the respective graphical form;
   forming a respective graphic element for each individual three-dimensional figure, each graphic element being a combination of the region information corresponding to the respective individual three-dimensional figure and the graphical information corresponding to each graphical form contained in the respective individual three-dimensional figure;
   forming at least one group of graphic elements, each group comprising at least one graphic element;
   establishing at least one group three-dimensional figure, each group three-dimensional figure containing a respective group of graphic elements;
   obtaining a spatial position of each group three-dimensional figure;
   storing the obtained spatial position of each group three-dimensional figure to define respective group region information;
   a first determining step of determining, when a processing request is requested for a designated region, whether any of the respective group three-dimensional figures lie at least partially within the designated region, the first determining step being performed by analyzing the group region information of each group three-dimensional figure;

a first excluding step of excluding the graphic data contained in a respective group three-dimensional figure from further processing by the processing request when the respective group three-dimensional figure is determined to lie outside the designated region in the first determining step;

a second determining step of determining, for each respective group three-dimensional figure determined to lie at least partially within the designated region, whether any of the respective individual three-dimensional figures of the respective group three-dimensional figure lie at least partially within the designated region, the second determining step being performed by analyzing the region information of each graphic element of the respective individual three-dimensional figure;

a second excluding step of excluding the graphic data contained in a respective individual three-dimensional figure from further processing by the processing request when the respective individual three-dimensional figure is determined to lie outside the designated region in the second determining step;

selecting the graphic data contained in a respective individual three-dimensional figure for further processing by the processing request when the respective three-dimensional figure is determined to lie within the designated region in the second determining step.

7. An apparatus for retrieving graphical data from a graphic data processing system that processes graphical forms, the graphic data processing system being responsive to a processing request to retrieve a graphical form from a designated region or a processing request to display a graphical form from a designated region, the apparatus comprising:

means for establishing a three-dimensional figure which contains at least one graphical form;

means for obtaining a spatial position of the three-dimensional figure;

means for storing the obtained spatial position, the stored spatial position being region information;

means for storing graphic data of each graphical form contained in the three-dimensional figure, the stored graphic data being graphical information;

means for forming a graphic element of the three-dimensional figure, the graphic element being a combination of the region information of the three-dimensional figure and the graphical information of each graphical form contained in the three-dimensional figure;

means for determining, when a processing request is requested for a designated region, whether the three-dimensional figure lies at least partially within the designated region, the determination being made by analyzing the region information of the graphic element;

means for excluding the graphic data contained in the three-dimensional figure from further processing by the processing request when the three-dimensional figure is determined to lie outside the designated region by the means for determining;

means for selecting the graphic data contained in the three-dimensional figure for further processing by the processing request when the three-dimensional figure is determined to lie within the designated region by the means for determining.

8. An apparatus as claimed in claim 7, wherein the three-dimensional figure represents a three-dimensional space having a form selected from the group comprising a sphere, a prism, a pyramid and a truncated cone.

9. An apparatus as claimed in claim 8 wherein a spatial region defined by the three-dimensional figure has dimensions which are sufficient to contain a graphical form having a three-dimensional figure to be inscribed therein.

10. An apparatus as claimed in claim 8 wherein the three-dimensional figure is a sphere.

11. An apparatus as claimed in claim 7, the dimensions of each graphical form corresponding to a set of graphical axes, wherein:

the means for establishing a three-dimensional figure establishes the three-dimensional figure to be a rectangular parallelepiped; and the means for obtaining a spatial position obtains a position, corresponding to the set of graphical axes, of a specific point of the rectangular parallelepiped and dimensions of each graphical form.

12. An apparatus for retrieving graphical data from a graphic data processing system that processes graphical forms, the graphic data processing system being responsive to a processing request to retrieve a graphical form from a designated region or a processing request to display a graphical form from a designated region, the apparatus comprising:

means for establishing at least one individual three-dimensional figure, each individual three-dimensional figure containing at least one graphical form;

means for obtaining a spatial position of each individual three-dimensional figure;

means for storing the obtained spatial position of each individual three-dimensional figure, the stored spatial position of each individual three-dimensional figure being region information corresponding to the respective individual three-dimensional figure;

means for storing, for each respective individual three-dimensional figure, graphic data of each graphical form contained in the respective individual three-dimensional figure, the stored graphic data of each graphical form being graphical information corresponding to the respective graphical form;

means for forming a respective graphic element of each individual three-dimensional figure, each graphic element being a combination of the region information corresponding to the respective individual three-dimensional figure and the graphical information corresponding to each graphical form contained in the respective individual three-dimensional figure;

means for forming at least one group of graphic elements, each group comprising at least one graphic element;

means for establishing at least one group three-dimensional figure, each group three-dimensional figure containing a respective group of graphic elements;

means for obtaining a spatial position of the group three-dimensional figure;

means for storing the obtained spatial position of each group three-dimensional figure to define respective group region information;

first determining means for determining, when a processing request is requested for a designated region, whether any of the respective group three-dimensional figures lie at least partially within the designated region, the determination being performed by analyzing the group region information of each group three-dimensional figure;

first excluding means for excluding the graphic data contained in a respective group three-dimensional figure from further processing by the processing request when the respective group three-dimensional figure is determined to lie outside the designated region by the first determining means;

second determining means for determining, for each respective group three-dimensional figure determined to lie at least partially within the designated region, whether any of the respective individual three-dimensional figures of the respective group three-dimensional figure lie at least partially within the designated region, the determination being performed by analyzing the region information of each graphic element of the respective individual three-dimensional figure;

a second excluding means for excluding the graphic data contained in a respective individual three-dimensional figure from further processing by the processing request when the respective individual three-dimensional figure is determined to lie outside the designated region by the second determining means;

means for selecting the graphic data contained in a respective individual three-dimensional figure for further processing by the processing request when the respective three-dimensional figure is determined to lie within the designated region by the second determining means.

* * * * *